(12) United States Patent
Ruehle

(10) Patent No.: US 9,117,170 B2
(45) Date of Patent: Aug. 25, 2015

(54) COMPLEX NFA STATE MATCHING METHOD THAT MATCHES INPUT SYMBOLS AGAINST CHARACTER CLASSES (CCLS), AND COMPARES SEQUENCE CCLS IN PARALLEL

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 13/681,328

(22) Filed: Nov. 19, 2012

(65) Prior Publication Data

US 2014/0143195 A1    May 22, 2014

(51) Int. Cl.
| | |
|---|---|
| *G06F 15/18* | (2006.01) |
| *G06N 5/02* | (2006.01) |
| *G06K 9/68* | (2006.01) |
| *G06F 17/30* | (2006.01) |
| *G06N 5/00* | (2006.01) |

(52) U.S. Cl.
CPC ............. *G06N 5/02* (2013.01); *G06F 17/30985* (2013.01); *G06K 9/6878* (2013.01); *G06N 5/00* (2013.01)

(58) Field of Classification Search
CPC .................. G06F 17/27; G06F 17/2735; G06F 17/30985; G06K 9/6878
USPC ................................................. 706/12, 45, 62
See application file for complete search history.

(56) References Cited

U.S. PATENT DOCUMENTS

| | | | |
|---|---|---|---|
| 8,024,802 B1 * | 9/2011 | Preston | 726/22 |
| 8,347,384 B1 * | 1/2013 | Preston | 726/23 |
| 8,448,249 B1 * | 5/2013 | Preston | 726/24 |
| 2003/0051043 A1 * | 3/2003 | Wyschogrod et al. | 709/230 |
| 2008/0059464 A1 * | 3/2008 | Law et al. | 707/6 |
| 2010/0229238 A1 * | 9/2010 | Ma et al. | 726/23 |
| 2014/0114996 A1 * | 4/2014 | Ruehle | 707/758 |
| 2014/0115263 A1 * | 4/2014 | Ruehle | 711/137 |
| 2014/0143195 A1 * | 5/2014 | Ruehle | 706/46 |
| 2014/0173603 A1 * | 6/2014 | Ruehle | 718/100 |
| 2014/0208076 A1 * | 7/2014 | Ruehle | 712/220 |

* cited by examiner

*Primary Examiner* — David Vincent
(74) *Attorney, Agent, or Firm* — Barnes & Thornburg LLP

(57) ABSTRACT

Disclosed is a method and system for matching a complex NFA state comprising a spinner followed by a character class sequence which may be represented by the general regular expression form [S] {N,M}[A0][A1] . . . [Ak−1]. An input transition activates the spinner and the spin count increments with successive matches of the spin class [S]. When the spin count is between N and M, sequence matching begins. Several base sequence CCLs are compared in parallel with a corresponding window of input symbols. If all match, a signal enters a delay line until the end of the base sequence. When the signal exits the delay line, extended sequence CCLs are accessed from a table sequentially and compared with successive input symbols. After the final extension CCL matches, an output transition is signaled. For short sequences, unused base sequence CCLs may be configured with look-ahead classes.

12 Claims, 4 Drawing Sheets

COMPLEX NFA STATE MATCHING METHOD THAT MATCHES INPUT SYMBOLS AGAINST CHARACTER CLASSES (CCLS), AND COMPARES SEQUENCE CCLS IN PARALLEL

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols. Further, instructions in other languages may be included with these standards, such as Java and Visual Basic. As information is transported across a network, there are numerous instances when information may be interpreted to make routing decisions. It is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY OF THE INVENTION

An embodiment of the invention may therefore comprise a system for matching input symbols from an input stream against CCLs in an NFA cell array, comprising a CCL comparator enabled to accept symbols from the input stream, and a spin sequence monitor and counter enabled to accept signals from the CCL comparator, wherein the NFA cell array is configured with a predetermined set of information, the CCL comparator performs CCL comparisons for a spinner and a base sequence of a complex state, and the spin sequence monitor and counter monitors spinner comparisons, maintains a spin count for comparison to a minimum spin count and maximum spin count, and receives an in-transition signal which enables spin count.

An embodiment of the invention may further comprise a method of matching an NFA state in at least one cell of an NFA cell array, the state comprising a spinner, the spinner comprising a spin class, followed by a CCL sequence, the method comprising configuring the at least one cell with predetermined information, activating the spinner via an input transition signal to the cell, incrementing a spin count pursuant to successive successful matches of the spin class with input symbols from an input stream, when the spin count ranges from a predetermined minimum to a predetermined maximum, beginning sequence matching, and comparing a predetermined number of the sequence CCLs in parallel with input symbols.

DETAILED DESCRIPTION OF THE EMBODIMENTS

Figure 1:
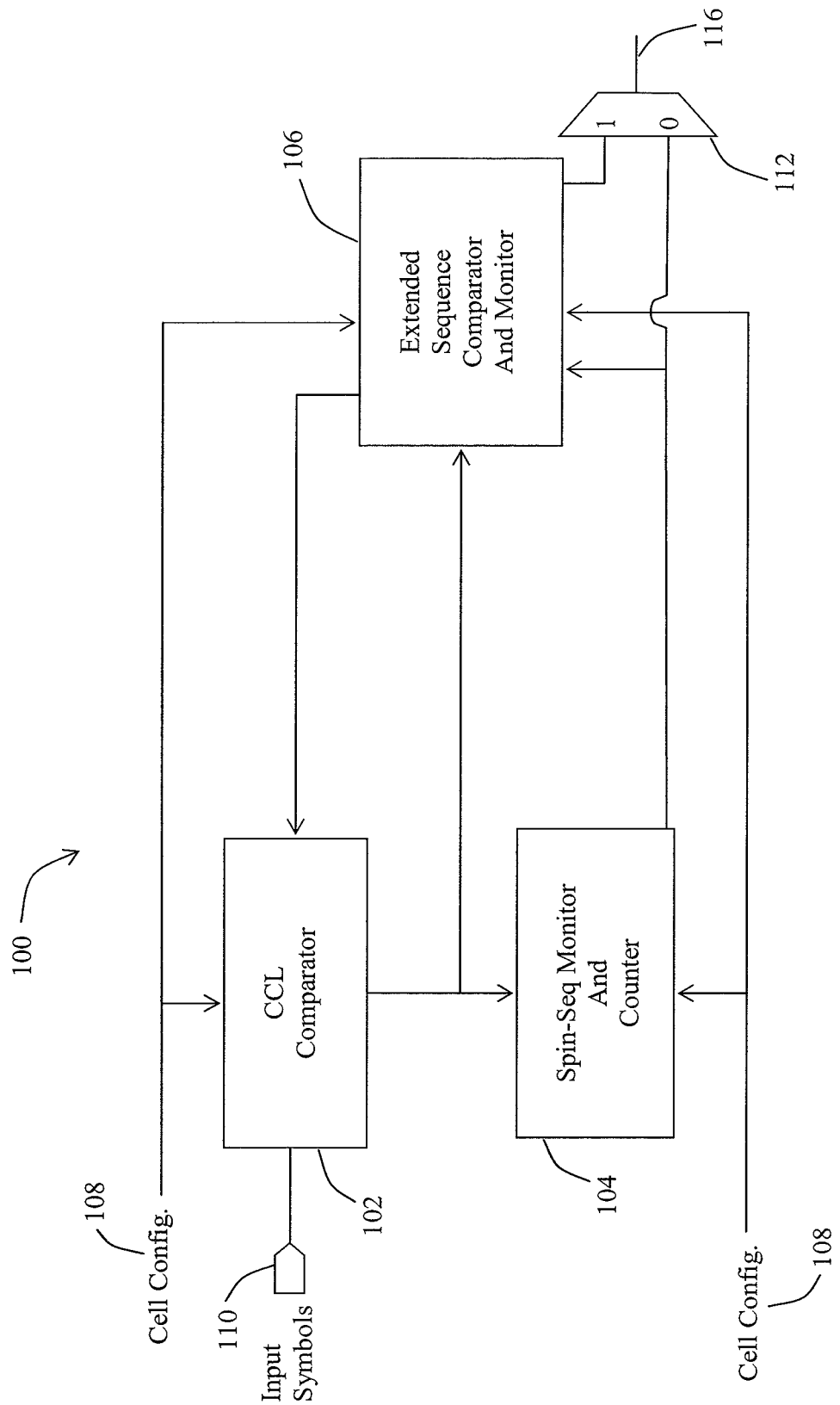
FIG. 1 is a block diagram of an embodiment of a complex NFA cell matching system.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
- the sequence of characters "car" appearing consecutively in any context, such as in "car", "cartoon", or "bicarbonate"
- the sequence of characters "car" occurring in that order with other characters between them, such as in "Icelander" or "chandler"
- the word "car" when it appears as an isolated word
- the word "car when preceded by the word "blue" or "red"
- the word "car" when not preceded by the word "motor"
- a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To match regular expressions or similar pattern matching rules, two main types of state machines may be constructed, nondeterministic and deterministic finite automata (NFAs and DFAs). NFAs for multiple rules are commonly executed separately, either in a sequential manner as in software, or in a parallel manner as in hardware. Regular expressions, or similar rules, may be matched by executing an NFA (nondeterministic finite automaton) by the Thompson NFA execution algorithm in a dynamically reconfigurable hardware NFA cell array. This may be implemented as described in U.S. Pat. No. 7,899,304 to Ruehle, which is incorporated herein by reference in its entirety. The NFA cell array may be aided by matching the beginnings of most rules using an external engine, which may utilize a DFA (deterministic finite automation) or hash tables, where both the external engine and the NFA cell array examine the same stream of input symbols.

Abstractly, an NFA is a directed graph of NFA states in which each graph edge is labeled with a class of input symbols that it accepts. This acceptance in turn represents a transition from a source state to a destination state on that symbol class. One or more "start states" are understood to be "active" at the beginning of a stream (or sequence) of input symbols or characters. As each symbol in the stream is consumed, an active state transitions to a destination state along an edge of the graph labeled with a class containing that symbol. Accordingly, destination states become active after the consumptions of that input symbol. The class of symbols labeling an NFA transition may be called a character class, or CCL.

A character class is a set of characters that will find a match if any one of the characters included in the set matches. For example, the character class [A-Z0-9#$%] matches any single character from A-Z, 0-9, or the characters '#', '$', and '%'. Similarly, the character class [aeiou] matches any single character included in the specified set of characters, i.e. any vowel in the English language.

A "universal character class" matches any characters in an available character set. For example, a universal character class may be represented using [\x00-\xFF] (assuming characters are represented using 8 bits) or '.'.

A "negated character class" is a set of characters that will find a match if any one of the characters not included in the set matches. For example, the character class [^aeiou] matches any single character not in the character class [aeiou].

A "repetition operator" or "quantifier" will repeat a character class a specified number of times. For example, the repetition operation {3} will find a match if the character class preceding the repetition operator is repeated three times. Repetition operators may also include a range, such as {x,y}, indicating that in order to find a match, the character class preceding the repetition operator must be repeated at least 'x' but not more than 'y' times. A repetition operator may comprise a range having equal lower boundary and upper boundary, e.g., {5,5} or simply {5}, or a zero lower boundary, e.g., {0,50}, or only a lower boundary with the upper boundary implied to be infinite, e.g. {10,}. The special repetition operators '?', '*', and '+' are equivalent to {0,1}, {0,}, and {1,} respectively; e.g. [ab]* matches zero or more occurrences of 'a' or 'b'. Note that in general regular expressions, repetition operators may apply to larger sub-expressions in parentheses, such as the expression "(hots)+" matching the strings "hots" or "hotshots", but herein repetition operators are discussed as applying to single character classes.

An "atom" is a combination of a character class and optional repetition operator. For example, the expression "[AZ]{1,5}" is an atom comprising the character class [A-Z]. A "byte counting atom" is a specific type of atom that uses the universal character class. It may be expressed as ".{1,5}", for example. An atom with a repetition operator, e.g. "[A-Z]{3,7}", is also referred to herein as a "spin expression" or a "spinning expression".

A "spinning state" is a state associated with a spin expression, such that one or more characters result in a transition to the same state (a "spin"). For example, the NFA states associated with the spin expressions [xyz]{5,20} and [-9876]{5,} are each spinning states. A spinning state with the '*' quantifier, such as [xyz]*, is a simple or classical NFA state, which transitions to itself on [xyz], and may have additional input and/or output transitions to other states. A spinning state with quantifiers other than '*' is a complex NFA state, which could be represented with a subgraph of multiple classical NFA states, these multiple states being necessary to count the spin CCL matches up to the lower boundary and/or upper boundary. For example, the complex spinning state [abc]{2,3} comprises a sequence of 4 simple NFA states, with any in-transitions entering the first simple state, transitions on [abc] from the first to the second, the second to the third, and the third to the fourth, and any out-transitions being identically attached from the third and fourth simple states.

According to the "Thompson" method of executing NFAs, as each input symbol is consumed, all transitions for each active state are taken together. This may potentially activate multiple destination states at once. A hardware NFA engine may be constructed to execute NFAs according to the Thompson method. In such an engine, multiple NFA cells exist as physical logic within a cell array where each cell is configured to track one or more NFA states derived from the rules. The states tracked by a cell may be active or inactive. Cells are able to signal to other cells and activate them. Such signals represent state transitions. The cell array is initialized with start states active and input symbols or information corresponding to those symbols are broadcast to the cells. Logic associated with each transition is configured to detect the proper symbol class. The logic examines each input symbol to determine if it belongs to the transition class. Whenever a state is active and the next symbol matches a transition class, a signal is sent to the destination cell.

The cell array may be statically configured with an entire NFA before scanning an input stream such that every NFA state in the graph is represented by at least one cell in the array. Also, according to the methods of the '904 patent, cells may be dynamically reconfigured on demand during a scan of an input stream. In this method, the cell array does not require a size large enough to accommodate the entire NFA at one time. The cell array needs only be large enough for active state subsets achieved during a scan. As taught in the '904 patent, when a cell is dynamically configured, signal connections are also configured dynamically between the cell and its destination and source states in the cell array.

A single cell may be able to represent more complex sub-graphs of multiple NFA states rather than only a single classical NFA state. Allowing complex sub-graphs to be represented in a single cell allows for efficient use of infrastructure to reconfigure cells dynamically and to communicate between states that may be configured into arbitrary cells. This infrastructure and communication can be expensive in terms of logic area where the cost increases with the number of cells. When a full crossbar is utilized for cell communication, for example, the crossbar cost is proportional to the square of the number of cells. Naturally, the increase in cells likewise increases the crossbar requirements. Therefore, infrastructure cost can be controlled by utilizing a smaller number of complex cells rather than a larger number of simple cells. For example, if each occupied complex cell in an array represents an average of 10 simple NFA states so that the number of cells required is 10 times less than if simple cells are used, then the crossbar cost is reduced by a factor of 10^2=100. It is understood that the cost advantage of complex cells may vary for statically configurable NFA cell arrays. However, the cost benefits of complex cells still exist.

A sub-graph of classical NFA states may be representable by a complex NFA cell and likewise be considered a complex NFA state. An NFA comprising a plurality of classical NFA states can also be considered as an NFA comprising a smaller number of complex states. It is therefore understood that any rules, methods, algorithms, architectures or systems for how a given complex NFA state operates when matching a steam of input symbols are equivalent to operating the corresponding sub-graph of classical NFA states. The terms "state" or "NFA state" may therefore be used to refer to a complex NFA state comprising a sub-graph of "simple" or "classical" NFA states.

In an embodiment of the invention a complex cell accommodates NFA sub-graphs that may occur frequently in practical applications of regular expressions and other rules. This is such that typical classical NFAs in use may be efficiently organized as a smaller number of complex states.

Spinning states are generally discussed above. More specifically, whereas a simple NFA state may match a single symbol class or character class (CCL) such as [abc] or [a] or [a-z], a spinner can match a quantified CCL such as:
 [a-z]{3}—matching 3 [a-z] characters
 [a-z]{5,10}—matching from 5 to 10 [a-z] characters
 [a-z]{0,1000}—matching up to 1000 [a-z] characters
 [a-z]{100,}—matching at least 100 [a-z] characters
 [a-z]?—matching 0 or 1 [a-z] characters
 [a-z]+—matching 1 or more [a-z] characters
 [a-z]*—matching any number of [a-z] characters
Generically, a spinner may be denoted as [S]{N,M} where the bracketed capital letter [S] stands for an arbitrary symbol class, such as [abcdefg] for example. N stands for a minimum value of the spin which may be zero or higher and M is a maximum value of the spin. M may not logically be smaller than N, and M may be infinite unless otherwise noted.

A cell configured as [S]{N,M} uses a counter to track a number of [S] symbols matched since the cell was activated by an in-transition signal. The cell could therefore be inactive if it has not received an in-transition signal or it could be active with a certain "spin count". When some active source state first transitions to a spinner, it becomes active with spin count zero. Then, as successive input symbols are consumed, if the next symbol matches the spin class, [S], and the spin count is less than M, the spinner remains active and the spin count increments by 1. Otherwise the spinner becomes inactive. The spinning state may also comprise one or more out-transitions with associated transition classes. For example, in the regular expression "abc[a-z]{0,20}def", the spinning state [a-z]{0,20} is extractable and has an output transition on the class [d]. The resulting spinner is represented as [a-z]{0,20}[d], or generically as [S]{N,M}[A]. In a cell representing this spinner with out-transition, the transition class [A] is considered only when the spinner is active with a spin count from N and M. When the spin count is in this range, and the next symbol matches class [A], an out-transition is signaled from the cell. This may activate a destination state or report a match by generating a token, or both.

In a binary spinner, the spin count is tracked by a binary counter with some -bit-length L, such as L=16, which can increment from 0 to 2^L-1. In a vector spinner, the spin count is tracked by a shift-vector of some predetermined bit length. This can be of the same length L in which bits are indexed from 0 to L-1. When bit K is '1', it means that a spin count equal to K is active. A vector spinner can therefore represent multiple spin counts at once and "incrementing" a vector spinner is done by up-shifting the bits so that a '1' at bit K becomes a '1' at bit K+1. Binary spinners may be used in certain circumstances, such as when the structure of the NFA is such that the spinner will never need to track two spin counts at once, or when the minimum spin is zero ([S]{0,M}) and it is adequate to track only the smallest spin count. A binary counter may also be used when the maximum is infinite ([S]{N,}) and it is adequate to track only the largest spin count. NFA cells can support binary or vector spinners. An NFA compiler is configurable to determine the appropriate spinner type. For many purposes, spinners may be of binary or vector type. The term "spin count" can refer to a single binary spin count or a vector potentially representing multiple spin counts. Incrementing a spin count refers to adding 1 to a binary spin count or up-shifting a vector spin count.

A state (simple or spinner) in an NFA cell array may have multiple out-transitions. Such a state may occupy a single cell capable of representing multiple out-transitions. It may also occupy multiple cells where one cell or all cells match the spin class and track the spin count and each cell matches a different transition class. For any complex cell design supporting a single out-transition, the design is upgradeable to support multiple out-transitions. Likewise, a cell array may be made to represent a multi-transition state in multiple cells. The discussion herein will generally consider complex NFA states and cells supporting single out-transitions. However, it is understood that there are extensions to multi-transition states and cells.

It is also understood that NFA cells may support more complex states than spinners. Spinners are useful because the complex state [S]{N,M}[A] comprises M+1 simple states when M is finite or N+1 simple states when M is infinite. Many applications employ regular expressions where N and M may be quite large, such as 10, 100, 1000 or larger. Rules commonly employ many constructs other than spinners, such as literal strings (e.g. "match these words") or more generally character class sequences (e.g. "[Mm]c[Dd]onald"), which would map as many simple states into cells supporting spinners. One common rule construct is two or more CCL sequences separated by spinners such as "[Oo]ffer.*[Ee]nds.*[Ss]oon" where '.' Denotes a CCL matching any character. A complex NFA cell may be designed which can be used to map these constructs into a small number of cells.

Embodiments of the invention comprise methods and apparatuses to match a complex NFA state comprising a spinner followed by a CCL sequence of up to some maximum length. This may be represented by the general regular expression form [S]{N<M}[A0] . . . [Ak-1] where k>1, within an NFA cell. This regex form, and the associated complex state (comprising an associated sub-graph of M+k+1 classical NFA states), may be called a "spin-sequence combination", "spin-seq combo", or "spin-seq" state. Because spinners and CCL sequences are among the most common regex constructs in practical applications, and any sub-expression comprised entirely of spinners and sequences can be organized into a series of spin-sequence combos, such complex NFA cells are well suited to efficiently represent application NFAs in relatively few cells, enabling a less expensive NFA cell array to handle a given application. The case where N=0 and M=0 is supported, [S]{0,0}[A0] . . . [Ak-1], which is the same as the CCL sequence [A0][A1] . . . [Ak-1] without the spinner. The case where k=1 is also supported, [S]{N,M}[A0], but this is a spinner with a CCL out-transition. As noted above, the spinner may use a binary or vector spin count.

In an embodiment of the invention, the spinner component of a spin-sequence combo state is matched as described above. Whenever the spinner is active with a spin count that is between the minimum and maximum spin values, sequence matching is considered active. The first sequence CCLs may then be compared. A spinner matching unit is connected to a sequence matching unit, such that whenever the spinner is active with a spin count between minimum and maximum, a signal transmits to the sequence matcher, which attempts to begin matching the CCL sequence.

FIG. 1 is a block diagram of an embodiment of a complex NFA cell matching method and system. The matching system 100 comprises a CCL comparator 102, a spin-sequence monitor 104 and an extended sequence comparison and monitor 106. A cell configuration input 108 provides cell configuration so that initial inputs are present in the cell(s) for use by the system 100. The CCL comparator is enabled to act on inputs from the cell configuration inputs 108. The CCL comparison may comprise CCL testing mechanisms, input symbol registers from the input symbol port 110 and logic to compute match results. The CCL comparison 102 will provide information to both the spin-sequence monitor 104 and the extended sequence comparison monitor 106. This information may be in the form of a sequence match indicator and input symbols for use by the other components. Spin match information may also be provided by the CCL comparison 102.

The CCL comparator 102 may process input symbols for a spin-sequence as well as for a sequence that is not a spinner. As is understood from the discussion above, a complex state may have a spinner component followed by a sequence. The sequence component of the spin-sequence combination is divided into a base sequence portion followed by an extended sequence. The CCL comparator 102 provides testing for input symbols against a spin CCL as well as the base portion of the sequence. The spin sequence monitor and counter 104 provides a counter for a spinner as well as an input mechanism for an in-transition signal 114 generated from a previous state/cell. The extended sequence comparator and monitor 106 provides a comparison mechanism for the extended sequence portion of the sequence.

Each of the base sequence and extended sequence will have a maximum length. For instance MB is the maximum CCLs for the base and ME is the maximum CCLs for the extension. The net maximum sequence length is MB+ME CCLs. To map a particular spin-sequence state with k CCLs, if k>MB, then the first MB CCLs will be applied to the base sequence portion and the remaining k-MB CCLs will be applied to the extension. Otherwise, the extension portion and the Extended sequence comparator and monitor 106 will not be utilized as all k CCLs will be part of the base sequence. Factors that may determine the size of MB and ME are the number of storage units in the CCL comparator dedicated to symbol processing and CCL storage and the size of storage unit in the extended sequence comparator for CCL storage.

The base sequence CCLs may be stored in registers in the CCL comparator 102 and compared in parallel with the next B input symbols. It is understood, that the parallel comparison may be with a number of successive input symbols or it may be with the same input symbol all at once. The number of comparators enabled to compare CCLs with input symbols will do the comparison, either way, in parallel. Where MB was the max base sequence, B is utilized here to indicate the base sequence size up to the maximum. The extended sequence CCLs may be stored in a table and a single selected CCL from the table will be compared with a symbol from the input symbols. After the base sequence has been matched (discussed more fully below), the next symbol in the input stream is compared with the first extension CCL. Then, the following symbol is compared with the second extension CCL. This continues until all extended CCLs have been compared with successive input symbols. If any comparison fails, the sequence fails to match and no output transition 116 will be signaled. The output transition signal 116 could be either a token or an in-transition to another state which is activated.

For purposes of example, consider the case of B=0. Accordingly, the whole sequence will be part of the extension. One CCL will be matched at a time. Also for purposes of example, the CCL sequence is the 7-CCL literal string "coconut". As will be seen, a transition issue arises for a sample input stream of "cococonut. The first four symbols of the input will appear to match. Successive CCLs [c], [o], [c], [o] from the extended sequence storage are accessed and compared successively and successfully. The next CCL [n] is accessed from the storage which does not match the next input symbol 'c'. Sequence matching fails and it is too late for the system to account for the alternate match beginning in with the second 'c' of the input symbols. In classical NFA terms, the CCL sequence "coconut" is constructed as a sequence of 7 states (plus an accepting terminal state), where the first state matching [c] is always active to support matching at any position. After the stimulus "coco", three states are active: the first state matching [c], the third state matching [c], and the fifth state matching [n]. The fifth state will fail to match on the actual next input symbol 'c'. The third state will transition successfully and will eventually lead to a match. So whereas a traditional NFA matching scheme may accommodate such an input, the extended sequence matching here requires a base sequence scheme to accommodate such an input.

Figure 2:
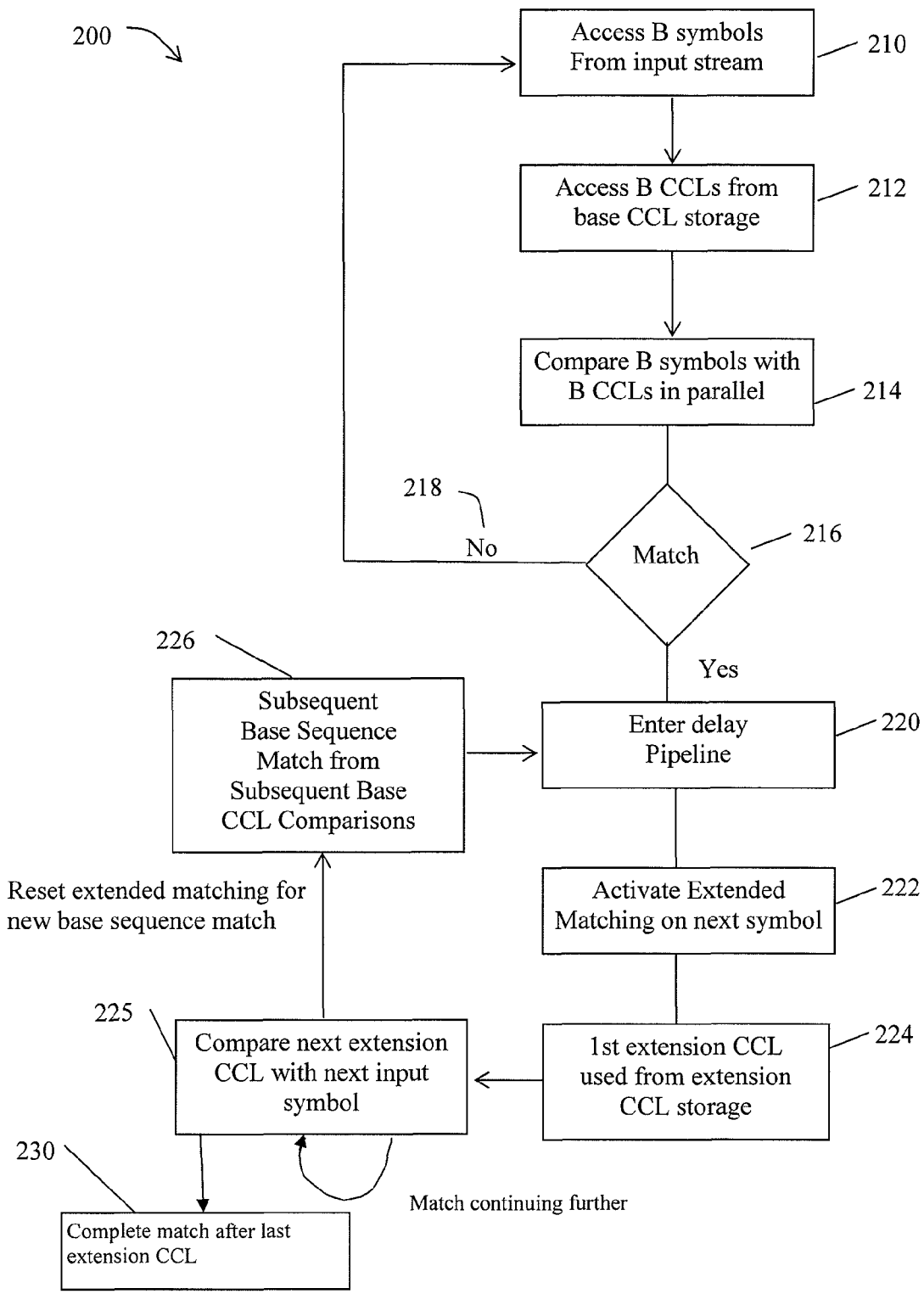
FIG. 2 is a diagram of an embodiment of a complex NFA cell matching system.

FIG. 2 is a flow diagram of an embodiment of a sequence matching method. B symbols from an input stream are accessed 210. Also, B CCLs are accessed from the base CCL storage 212. The base sequence operates by comparing the first B CCLs to a window of next B input symbols, beginning with the current symbol, in parallel 214. All B symbols must match 216 or they will be ignored and a spin sequence matching (not shown) will continue if appropriate 218. After all B symbols match, a signal enters a delay line B−1 steps long 220. When it emerges from the delay line, the base sequence match is complete. The current symbol being the last symbol of the base sequence match. The delayed signal is used to activate extended sequence matching on the following symbol 222. The extended sequence matching begins 224 with the first extension CCL from the extension CCL storage, a table for example. Step 225 compares a next extension CCL with a next input symbol which occurs if the extended match continues. If an extended sequence match is in progress but another base sequence match signal emerges from the delay line, extended sequence matching must start over on the following input symbol 226. A continuation of the match may occur as indicated by step 225 returning to itself. Also step 225 may result in a complete match after the last extension CCL 230. It is understood, that the delay line may not be necessary in all embodiments of the invention. In the situation where the parallel comparison is with the same input symbol all at the same time, no delay line is necessary.

Again for purposes of example, assume a sequence of "coconut" with a base sequence length of B=4. At the first symbol in the input "cococonut", the 4 base CCLs [c], [o], [c], [o] match. A signal is sent which enters a 3-step delay line.

The delay length will be B−1. At the third symbol, the middle 'c', the 4 base CCLs match again. A second 3-step delay is entered. The first delayed signal emerges at the fourth symbol, the middle 'o', so extended sequence matching of [n], [u], [t] begins at the fifth symbol, 'c' which fails to match. Then the second delayed signal emerges at the sixth symbol, the last 'o', so extended sequence matching restarts at the seventh symbol, 'n', which matches. This is followed by further extended matching on 'u' and 't'.

The base sequence may also be constructed to match similarly to corresponding classical NFAs. This means that the symbols and comparisons will be executed 1 at a time—sequentially. There are separate sub-states for each CCL in the base sequence, which may be independently active or inactive. Each active sub-state compares its corresponding CCL with the current input symbol. When the last base sequence sub-state is active and its CCL matches the next input symbol, the base sequence match is complete. This is acceptable, but parallel matching of base sequences offers distinctions. First, the "window" method detects match failures within the base sequence earlier, which can reduce the total time that the cell is active. This can lead to reduced cross-packet context, for example. Second, the "window" construction can be used to provide look-ahead capability when the full CCL sequence is shorter than MB CCLs, as will be discussed below.

The base/extension sequence matching method may not be ideal for all CCL sequences. If B=4 and the CCL sequence is "cocococonut", the system can still be fooled, as discussed above, by some inputs. A policy rule can be used to determine which CCL sequences are "safe." This policy allows the compiler to prevent ambiguous sequence matching. The first B CCLs of the sequence must not all have non-empty intersections with any other window of B consecutive CCLs properly inside the sequence (ignoring the window of the very last B CCLs). So, "coconut" passes this policy test. The first B CCLs, [c][o][c][o], do not have concurrent nonempty intersections with any other 4-CCL window. There is a partial intersection with the third to sixth CCLs, [c][o][n][u], but there are empty intersections at the third and fourth positions ([c] v. [n], and [o] v. [u]). Most CCL sequences appearing in practical regex applications will pass this test if B is not too small, such as B=2, for example. This is based on experience and will be understood by those skilled in the art. A B=4 value provides an adequate margin of error. B=4 will be tolerant of partial match overlap.

The extended sequence storage may be a table as discussed. Table-based extended sequence matching allows for support of longer sequences in a spin-seq cell without high area and power cost. For example, it is practical to construct cells with B=4 and E=24, for a maximum sequence length of 28 CCLs. This has the cost of storage of 2 CCLs but does not require as many CCL test units to make parallel comparisons of CCLs with input symbols. B separate CCL tests (parallel testing) are needed for the base sequence, but only one CCL tester is needed for the extended sequence because only one CCL from the table is compared at a time. One additional CCL test unit is required for spinner matching, so B=4 and E=24 requires the area and power of only 6 CCL test units.

Figure 3:
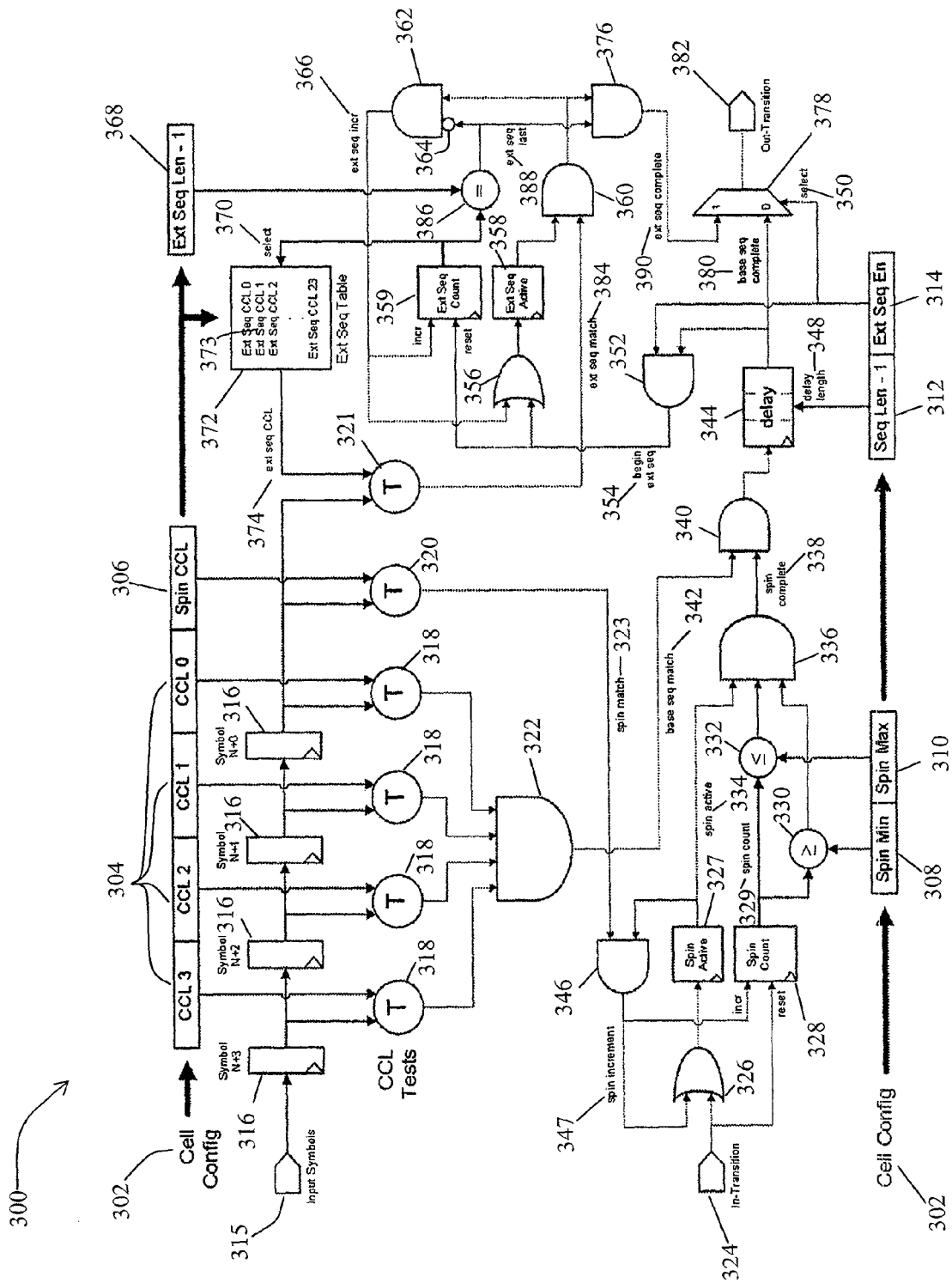
FIG. 3 is a flow diagram of an embodiment of a complex NFA cell matching system.

FIG. 3 is diagram an embodiment of a spin-sequence matching system. In the system 300, B=4 and E=24. A cell configuration 302 programs several elements of the system 300. The base sequence classes CCL0, CCL1, CCL2 and CCL3 304 are programmed by the cell configuration 302. The spin CCL 306 is programmed by the cell configuration 302. The extended sequence table 372 is programmed to contain extended sequences CCL0 through extended sequence CCL23. The extended sequence length used, represented with "Ex Seq Len−1" 368 is programmed by the cell configuration 302 as well as an enable bit "Ext Seq En" 314 for the extension. The base sequence length used, represented as "Seq Len−1" 312, the spin minimum 308 and the spin maximum 310 are programmed by the cell configuration 302. The fields programmed by the cell configuration 302 may be configured statically for a particular spin-sequence combination state before scanning an input stream begins. The fields programmed by the cell configuration 302 may also be configured dynamically on demand. In dynamic configuration, one or more NFA instructions may be accessed to configure the cell. Spin parameters and base sequence parameters may be encoded in one instruction or a small number of instructions. Extended sequence parameters may be encoded in zero or more additional instructions as needed for the configured sequence length.

In FIG. 3, input symbols 315 enter a shift array of four registers 316. The current symbol is N and is in the right most register. The next symbol in the input is N+1 and is the next register. All four registers 316 are compared with the base sequence classes CCL0-CCL3 304 in four parallel CCL test units 318. A match with the contents of a register 316 and a CCL 304 will result in a positive input to a four input AND gate 322. Accordingly, the four input AND gate 322 will detect when all four input symbols 316 match with the corresponding stored base CCLs 304. The output of the four input AND gate 322 is a base sequence match signal 342. A spin CCL 306 is also compared with the current symbol N 316 in an additional test unit 320. A positive match from the spin test unit 320 will produce a spin match signal 323. One additional tester, an extended test unit 321 is utilized to compare an extended CCL 373 from the extended CCL table 372. A positive match will result in an extended sequence match indicator 384.

An in-transition input signal 324 activates the cell. This in-transition signal 324 may be generated from a parent state transitioning to this state. The in-transition signal 324 may also be generated from another source. The in-transition signal 324 sets the spin active register 327 to '1' via the spin active OR gate 326. The in-transition signal 324 also provides a reset signal to the spin count register 328. In the case of a vector spinner, a "reset" means that the spin counter vector gets bit 0 set to '1'. With the spin active register 327 being set to '1', the spinner is active 334. Unless the spin minimum 308 is zero, the comparison 330 with spin count 329 will fail. Each time the spin CCL 306 matches a next symbol from the input stream, the spin match 323 signal will be high, which means that spin active will remain high due to the spin active OR gate 326. The spin count register 328 will increment. In the case of a vector count, the vector will up-shift. If the spin CCL 306 fails to match, in the absence of another in-transition signal 324, the spin active register 327 will receive a low input and the spinner will be inactive until another in transition signal 324.

If at some point spin active 334 is '1' and spin count 329 has incremented to the range where the spin minimum comparator 330 and the spin maximum 332 comparators are satisfied (the spin count 329 is from spin minimum 308 to spin maximum 310), the 3-input AND gate 336 will provide a high spin complete 338 signal. The spin match 323 and the spin active signal 334 set the spin increment signal 347 high via the spin increment AND gate 346. The spin complete signal 338 may stay high for multiple input symbols. This is so if the spin CCL 306 continues to match and the spin count 329 remains in the range of spin minimum 308 and spin maximum 310. It is noted that FIG. 1 does not indicate a signal for clearing the spin active register 327 when the spin count 329 exceeds the spin maximum 310. FIG. 1 also does not show an explicit mechanism for storing and comparing infinite spin maximums. It is understood that the figure is modifiable to provide such mechanisms.

Any time spin complete 338 is high, the sequence portion of the cell may activate. If the base sequence classes 304 all match at the CCL testers 318, the base sequence match signal 342 is high. The 2-input AND gate 340 will provide a high input to the delay line 344. The sequence length register 312 determines the length of the delay 348. The signal from the AND gate 340 will emerge Seq Len−1 steps later as a base sequence complete signal 380. If there is not sequence extension, i.e. extended sequence enable 314=0, then the base sequence complete signal 380 will pass through a multiplexer 378 to an out-transition 382. The extended sequence enable signal provides a selection input 350 to the multiplexer 378. As shown in FIG. 3, the multiplexer 378 is a 2 to 1 multiplexer used as a control switch to provide selection for an out-transition 378.

Otherwise, with extended sequence enable 314 high, the base sequence complete signal 380 will pass extended sequence 2-input AND gate 352 to provide a begin extended sequence signal 354. The begin extended sequence signal 354 will set the extended sequence active 358 via the extended sequence OR gate 356. The begin extended sequence signal 354 also resets the extended sequence count 359. This reset will override any increment signal from the extended sequence increment signal 366, discussed further below. The extended sequence count 359 will select extended sequence CCL0 373 from the extended sequence table 372 to be compared with the current symbol N 316 at the extended sequence tester 321 to yield an extended sequence match 384. The extended sequence match will get qualified by the extended sequence active 358 at an qualifier AND gate 360. The resulting signal from the qualifier AND gate 360 goes to an extended sequence complete AND gate 376 and to an extended sequence increment AND gate 362. The extended sequence match 384 thus has two effects. If extended sequence count 359 is determined by the extended sequence comparator 386 equal to the extended sequence length −1 368, it passes to extended sequence complete 390 through the AND gate 376 which passes to the out-transition signal 382 through the multiplexer 378. Otherwise, the extended sequence match 384 passes to the extended sequence increment 366 due to the inverter 364 on the AND gate 362. This will increment the extended sequence count 359 and retain the extended sequence active 358 high. The extended sequence active 358 drops to low automatically if an extended sequence CCL 373 (selected by the count select 370 of the extended sequence count 359) fails a compare test at the extended sequence tester 321. The extended sequence active 358 also drops to low at the end of the extended sequence which will occur when the extended sequence comparator 386 produces a high output. A high output from the extended sequence comparator 386 (an extended sequence last 388 indicator will be high) and a match from the extended sequence tester 321 will produce an extended sequence complete 390 high.

The out-transition 382 output signal can trigger any action appropriate to matching of the spin-seq combo sub-expression. This may include signaling a child cell to activate the next state or outputting a token if a full rule has been matched.

It is understood that there may be no spinner in the complex cell. If there is not a spinner, the spin minimum 308 and spin maximum 310 may be configured by the cell configuration 302 to zero along with an "empty" (never matching) spin CCL 306. The cell will properly match a base and extended sequence accordingly. An in-transition 324 will activate spin active 327 and spin complete 338 will immediately go high so that sequence matching can immediately begin. The step after an in-transition 324 will be spin active 327 going low due to spin match 323 being low.

If the sequence length k is less than B, e.g. B=4 in FIG. 3, base sequence CCLs 304 from CCL to CCL k−1 may be configured so that CCL k to CCL B−1 are always configured with a "full" (always matching) CCLs. This will prevent the CCLs which are not actually part of the base sequence from interfering with base sequence matching. The delay line 344 will signal an out-transition 382 after the correct match length. The unused CCLs can be used in another manner also. These unused CCLs can be used as early look-ahead for matching that may occur in successive NFA states. If, although the sequence in the cell ends in fewer than B CCLs, it can be determined that any successful full rule match will require one or more of the next B-k symbols to match certain "look-ahead" symbol classes, those classes can be configured into CCL k to CCL B−1 rather than "full" CCLs as mentioned above. Such a look-ahead may be used to prevent needless state transitions. In a dynamically reconfigurable NFA cell array, reducing the number of cell out-transitions by such preventative look-ahead can improve performance because each transition risks a stall if the destination state is not yet configured in the cell array.

For example, in the expression "abc*def*ghi" a spin-seq state may be used for c*de". The base sequence length of 2 is less than the example base sequence length of 4 shown in FIG. 3. Two unused CCLs remain for look-ahead. It may be observed that after matching "de", the next symbol must be either 'f' or 'g' to match. If it is 'f', then the following symbol must be 'f' or 'g', otherwise the following symbol must be 'h'. Therefore, after the "real" base sequence classes [d][e], the remaining classes can be configured as [fg][fgh] for look-ahead. The utility of the look-ahead can be exemplified by an input stream such as "abcccdefxyz". The c* spinner activates after 'ab' and 'de' matches the sequence after the spinner. After 'de', 'f' will match look-ahead class [fg], but 'x' will not match [fgh]. The sequence is considered to fail and no out-transition will be signaled. Accordingly, the child state (f*ghi) is not activated and if it is not present in the cell array, no stall is triggered.

In an embodiment of the invention, the system may be pipelined in various ways to reduce maximum logic depth and increase maximum operating clock frequency. For example, CCL comparisons can be performed in one clock cycle and out-transitions signaled in the following clock cycle. This may be helpful if the out-transition needs to transmit through a cell communications crossbar, or the like, which may involve substantial delay. One skilled in the art can implement pipelining.

Figure 4:
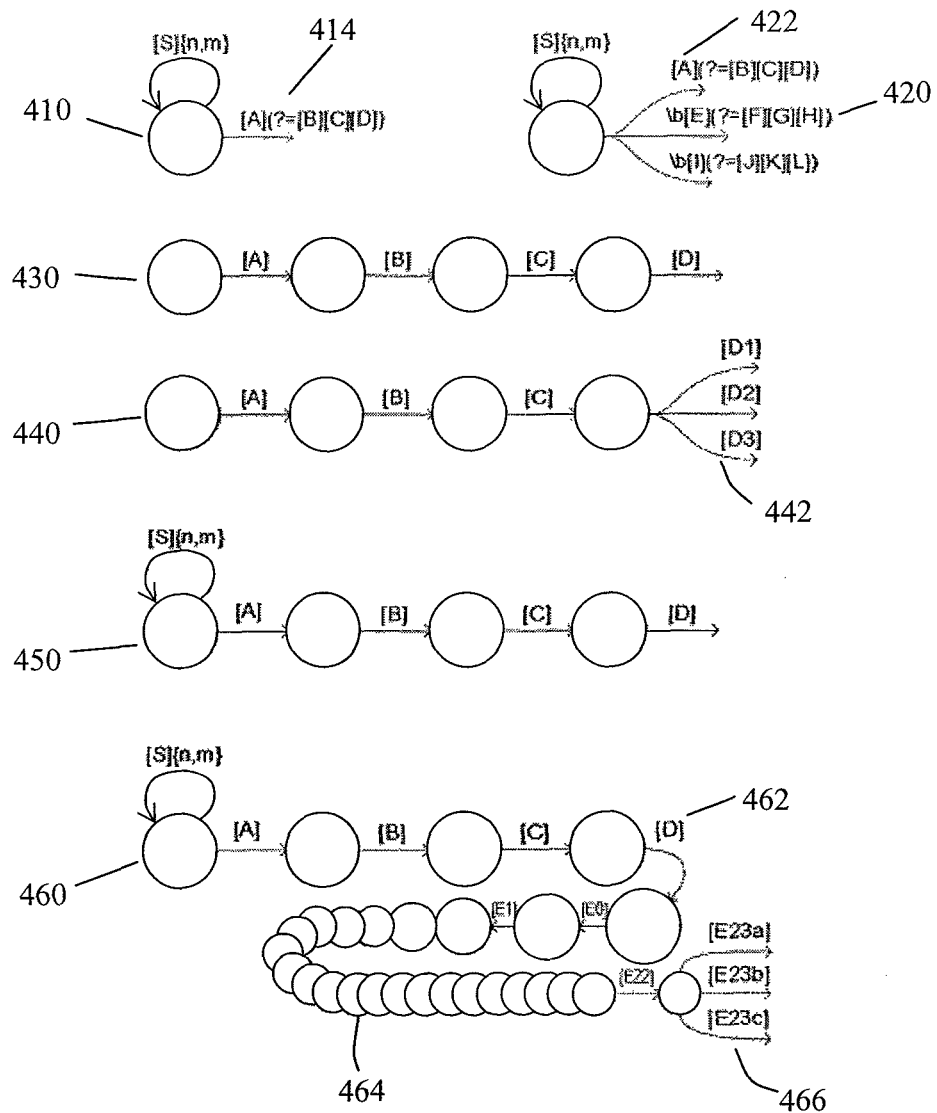
FIG. 4 is a representation of a series of NFA graphs.

FIG. 4 is a representation of a series of NFA graphs. The diagrams show representations of spin-sequence combination sates for B=4 and E=24 (as in FIG. 3) with the sequence portions expanded to classical NFA states. Some of the examples show look-ahead classes and some examples show multiple out-transitions. These may be accomplished by use of multiple spin-seq cells or by additional cell logic to match alternative final CCLs.

A standard NFA state is shown 410. The standard state 410 shows a spinner state. Lookahead classes 414 are shown for [A](?=[B][C][D]). In typical notations, a cell with this state is configured where the (?=) group indicates non-consuming look-ahead. The cell configuration will not match and consume. The cell just looks to see if the CCLs are in the incoming symbols.

A multi-transition state 420 is shown with multiple out-transitions 422. The multi-transition state 420 shows a spinner state. As noted above, this may be configured as three cells for the one state to handle the multiple transitions. Also, this could be configured as one cell with multiple transition logic.

A sequence of states 430 is shown. In this sequence, the system of FIG. 3 can compare [A], [B], [C] and [D] in parallel. Similarly the sequence of states 440 with multiple transitions 442 is well suited to parallel comparisons. The multiple transitions will be processed likewise to the previous multi-transition state 420.

A spin-sequence 450 is shown. The spinner will spin until a count is from n to m and then symbols will be compared in parallel for the [A], [B], [C], [D] sequence. There is no extended sequence so if a match to the sequence occurs, with B=4, then an out-transition will be triggered.

The last NFA 460 shows a spin-seq with a base sequence 462, an extended sequence 464 and multiple transitions 466. The spinner will count until it is from n to m and the base sequence will be activated in the system 300 of FIG. 3. The extended sequence 464 will be enabled if the base sequence matches.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of matching an NFA (nondeterministic finite automaton) state in at least one cell of an NFA cell array, said state comprising a spinner, said spinner comprising a spin class, followed by a CCL (character class) sequence, said method comprising:
   configuring the at least one cell with predetermined information;
   activating the spinner via an input transition signal to the cell;
   incrementing a spin count pursuant to successive successful matches of the spin class with input symbols from an input stream;
   when the spin count ranges from a predetermined minimum to a predetermined maximum, beginning sequence matching; and
   comparing a predetermined number of the sequence CCLs in parallel with input symbols.

2. The method of claim 1, wherein said predetermined number of the sequence CCLs comprises a portion of the CCL sequence, wherein any portion of the CCL sequence not comprised of the predetermined number is an extended CCL sequence.

3. The method of claim 2, said method further comprising, if the CCL sequence comprises an extended sequence:
   accessing a first extended sequence CCL, and comparing the first extended sequence CCL with a successive input symbol from the input stream; and
   if the first extended sequence CCL matches the successive input symbol, continuing to access remaining extended sequence CCLs, and comparing said remaining extended sequence CCLs with further successive input symbols from the input stream.

4. The method of claim 2, said method further comprising, if the CCL sequence does not comprise an extended sequence, signaling an out transition.

5. The method of claim 1, wherein the step of comparing a predetermined number of sequence CCLs in parallel comprises comparing the predetermined number of sequence CCLs in parallel with a corresponding number of successive input symbols.

6. The method of claim 1, wherein the step of comparing a predetermined number of sequence CCLs in parallel comprises comparing the predetermined number of sequence CCLs in parallel with the same input symbol.

7. The method of claim 5, further comprising:
   if all of the predetermined number of the sequence CCLs successfully match the input symbols, entering a delay line with a length corresponding to the length of the predetermined number of the sequence CCLs;
   when the delay line terminates, accessing at least one extended sequence CCL; and
comparing the at least one extended sequence CCL with a successive input symbol from the input stream.

8. The method of claim 3, further comprising:
   signaling an out-transition when the predetermined number of the sequence CCLs successfully matches the corresponding input symbols or when a final extended sequence CCL matches an input symbol.

9. The method of claim 3, wherein:
   said predetermined information configured in the at least one cell comprises a plurality of base CCLs stored in a plurality of storage units said base CCLs being used in the step of comparing a predetermined number of the CCL sequence in parallel, at least one extended sequence CCL which is stored in a table in the cell and which is used in the step of accessing a first extended sequence CCL, a spin minimum, a spin maximum, and an extended sequence length field.

10. The method of claim 9 wherein said spin count is a vector.

11. The method of claim 9 wherein said spin count is binary.

12. The method of claim 1, further comprising:
   if at least one of the predetermined number of CCL sequences does not successfully match the input symbols, terminating the NFA state.

* * * * *